United States Patent Office 3,019,217
Patented Jan. 30, 1962

3,019,217
AZOPYRAZOLONE DYE FOR POLYESTER FIBERS
Asa W. Joyce, Millersville, Md., assignor to American Cyanamid Company, New York, N.Y., a corporation of Maine
No Drawing. Filed Apr. 1, 1959, Ser. No. 803,370
1 Claim. (Cl. 260—163)

This invention relates to a new pyrazolone azo dye and to polyester fibers dyed therewith. More particularly it relates to a new pyrazolone azo dye of the formula

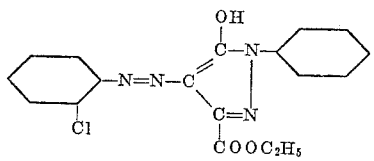

and to polyester fibers derived from terephthalic acid, colored with the above dye.

Polyester fibers derived from terephthalic acid and glycol or other polyhydric alcohols have appeared on the market under a number of trade names. There are few dyes known which are suitable for dyeing them. Acid and direct dyes have no affinity whatsoever for this type of fiber. While acetate dyes have some affinity they tend to have poor light fastness and are usually undesirable. There is a large need in the market for a dye which possesses good fastness and good affinity for polyester fibers since the use of these fibers is increasing rapidly in the textile trade.

I have found a new dyestuff which meets the requirements for polyester fibers. This dye is a bright greenish yellow, a shade of yellow difficult to obtain, especially when as in this case, it is accompanied by excellent color value, good crock resistance, and excellent light fastness on polyester fibers. The dyestuff has the formula

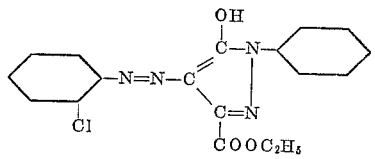

I have further found that the combination of this dye and polyester fibers has unique properties in that the excellent light fastness which this dyestuff shows on polyester fibers is not shown by the same dyestuff on other fibers such as nylon or acetate rayon.

The dyestuff of my invention is prepared by coupling diazotized ortho-chloroaniline to 1-phenyl-3-carboethoxy-5-pyrazolone according to the equation

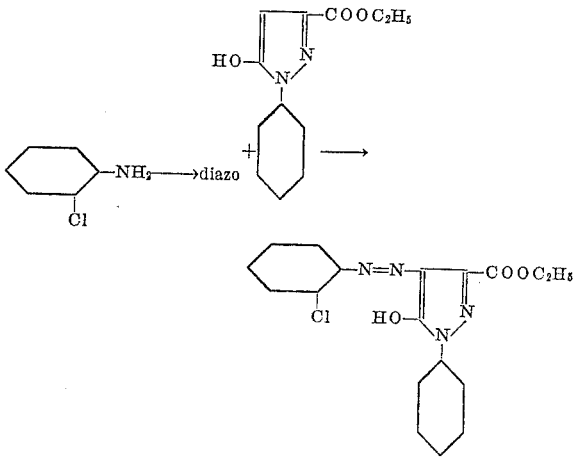

This reaction is carried out by the methods of diazotization and coupling well known in the art of azo dyes.

The dyestuff is dyed on polyester fibers by methods usually used in the art of dyeing of such fibers consisting of immersing the fiber in a bath containing the dye, water and a carrier. The usual dispersed dyeing carriers used for polyester fibers such as methyl salicylate or ortho-phenylphenol are readily used in this process. The dyeing may also be carried out at elevated pressures. The dyeing is carried out at about 200° F. and the dye builds up well on the fibers. The polyester fiber is thus dyed a bright greenish yellow of excellent strength and fastness to light, gas fading, washing, crocking and perspiration.

It is an advantage of the dye of my invention that it is a distinct improvement over the nearest dye type used presently in commerce. The latter dye is not an azo dye but rather is 2-nitrodiphenylamine-4-sulfonanilide. The dyestuff of my invention is brighter in shade, bleeds less after scouring, shows a better potting fastness, dyes stronger with the carriers, gives pressure dyeings which do not bleed on rinsing and possesses better wash and perspiration fastness than does this diphenylamine dye. It is a further advantage of the dye of my invention that it has remarkably good affinity for polyester fibers. Still further it is an advantage of my invention that the fastness to light on polyester fibers is extraordinarily good having a value of 5 to 6 on the standard light fastness scale. The dyestuff also dyes other fibers such as superpolyamides like nylon, but the combination of the dye with these other fibers gives a much lower light fastness of the order of 3 or 4. The light fastness on polyester fibers is thus not a property of the dyestuff itself, but rather a property of the dyestuff in combination with polyester fibers.

The polyester fibers which, when dyed with the dye of my invention, form the dyed fibers of my invention, comprise the polyesters of terephthalic acid and various polyhydric alcohols. The principal polyhydric alcohol used is ethylene glycol although other polyhydric alcohols such as glycerine, propylene glycol, p-xylylene glycol and the like may be used.

My invention can be illustrated by the following examples in which parts are by weight unless otherwise specified.

*Example 1*

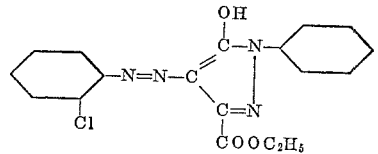

19.5 parts of o-chloroaniline is dissolved in 75 parts by volume of 5N hydrochloric acid by warming at 80–85° C. This solution is cooled to 0–5° C. by adding about 300 parts of flake ice and the resultant slurry is diazotized by the slow addition of 10.5 parts of sodium nitrite dissolved in 30 parts of water. A clear solution is obtained which gives a positive test for nitrous acid after stirring for 15 minutes at 5° C. Excess nitrous acid may be destroyed by the addition of sulfamic acid.

34.8 parts of 1-phenyl-3-carbethoxy-5-pyrazolone is dissolved in a solution of 30 parts of sodium carbonate in 1000 parts of water. The solution is cooled to 10° C. by addition of about 200 parts of flake ice. The solution of diazo prepared as described above is then added in a thin stream at 10–12° C. When addition is complete, a test for the diazo component with alkaline R-salt is negative and a test for the pyrazolone with diazo para-nitraniline is positive. The bright yellow slurry is stirred while allowing the temperature to rise to room temperature. The mixture is then warmed to 50° C., filtered and the product washed with warm water until the filtrate is free from alkali. The product is then dried at 50° C.

Example 2

17.5 parts of the product of Example 1 and 82.5 parts of lauryl sodium sulfate are dry blended to give 100 parts of a blend suitable for dyeing on polyester fibers. In place of the lauryl sodium sulfate an equal amount of a polyoxyethylene ester of mixed fatty and rosin acids may be used.

Example 3

To 200 ml. of water is added 3 grams of a methyl salicylate emulsion prepared by stirring a solution of 20 parts of dioctyl sodium sulfosuccinate and 20 parts of the reaction product of p-octylphenol with 10 moles of ethylene oxide in 400 parts of methyl salicylate into 440 parts of water. Then 5 grams of poly glycol terephthalate (Dacron) fabric is introduced and the temperature is raised to 200° F. The dyeing is carried out at 200° F. for one hour. The dyed fabric is then rinsed with hot water to remove any trace of carrier. It is then introduced into a 0.1% soap solution, also containing 0.1% soda ash, held at the boil and kept there ten minutes to remove any loose dyestuff not adhering to the fibers. The fabric or fiber is then rinsed with hot and cold water and dried at 160° F.

The fabric thus dyed is a bright attractive greenish-yellow color. It has good fastness to light (rating 5–6). It is resistant to gas fading (rating 4–5). It has good fastness to perspiration (rating 5 for acid and 4–5 for alkaline perspiration). It has good fastness to washing (rating 4–5).

Another carrier which may be used (although slightly inferior) is the sodium salt of o-phenylphenol. This is a commercially used carrier for dyeing polyester fibers. It is used with equal amounts of diammonium phosphate which converts it from the Na salt to the phenol in the dye bath. It is in the phenol form that it functions as a carrier. The dyeing procedure is otherwise the same. 1 gram of the sodium salt of o-phenylphenol and 1 gram of diammonium phosphate are used.

It also dyes nylon, acetate and similar fabrics yellow shades using similar dyeing procedures but without the carrier. However these dyeings have inferior light fastness.

I claim:

The compound

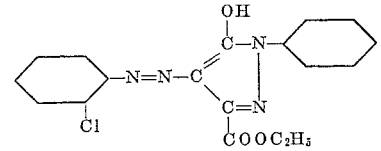

References Cited in the file of this patent

UNITED STATES PATENTS

| | | |
|---|---|---|
| 1,819,547 | Eichwede et al. | Aug. 18, 1931 |
| 2,195,390 | Ellis et al. | Mar. 26, 1940 |
| 2,717,823 | Lowe | Sept. 13, 1955 |
| 2,741,656 | Schmid et al. | Apr. 10, 1956 |

OTHER REFERENCES

The Textile Manufacturer, April 1958, page 205.